United States Patent
Min

(10) Patent No.: US 9,269,944 B2
(45) Date of Patent: Feb. 23, 2016

(54) BATTERY MODULE

(71) Applicants: Hyundai Motor Company, Seoul (KR); Kia Motors Corporation, Seoul (KR)

(72) Inventor: Hong Seok Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 418 days.

(21) Appl. No.: 13/840,170

(22) Filed: Mar. 15, 2013

(65) Prior Publication Data

US 2014/0127540 A1    May 8, 2014

(30) Foreign Application Priority Data

Nov. 7, 2012  (KR) .................. 10-2012-0125303

(51) Int. Cl.
  *H01M 2/34*   (2006.01)
  *H01M 2/20*   (2006.01)

(52) U.S. Cl.
  CPC .............. *H01M 2/345* (2013.01); *H01M 2/206* (2013.01)

(58) Field of Classification Search
  CPC ..................................................... H01M 2/345
  USPC ........................................................... 429/61
  See application file for complete search history.

(56) References Cited

U.S. PATENT DOCUMENTS

2011/0039147 A1*  2/2011  Cheon et al. ................. 429/159

FOREIGN PATENT DOCUMENTS

| JP | H05-300672 A | 11/1993 |
|---|---|---|
| JP | 2003-132873 A | 5/2003 |
| JP | 2006-238619 A | 9/2006 |
| JP | 2011-090873 A | 5/2011 |
| JP | 2011090873 A | 5/2011 |
| KR | 10-2000-0014670 A | 3/2000 |
| KR | 10-2007-0091814 A | 9/2007 |
| KR | 10-2009-0043717 A | 5/2009 |
| KR | 10-2009-0052802 A | 5/2009 |
| KR | 1020090052802 | 5/2009 |
| KR | 10-2010-0077123 A | 7/2010 |
| KR | 1020100077123 A | 7/2010 |

* cited by examiner

*Primary Examiner* — Stewart Fraser
*Assistant Examiner* — Rachel L. Zhang
(74) *Attorney, Agent, or Firm* — Mintz Levin Cohn Ferris Glovsky and Popeo, P.C.; Peter F. Corless

(57) ABSTRACT

A battery module is provided, including: a plurality of battery packs teach being provided with an anode terminal and a cathode terminal; a plurality of coupling units each having ends coupled to the anode terminal and the cathode terminal of an adjacent battery pack, respectively, to couple the plurality of battery packs in series; an operation unit that is provided on one end of the coupling unit and ascends in accordance with an increasing internal pressure of the battery pack to open a coupling between the one end of the coupling unit and the terminals of the battery pack by raising the one end of the coupling unit; and a bypass unit having one end disposed over the one end of the coupling unit and the other end coupled to the other end of an adjacent coupling unit to maintain the other battery packs coupled in series, except for the battery packs the internal pressures of which have increased, when the one end of the coupling unit ascends by the operation unit.

9 Claims, 4 Drawing Sheets

BATTERY MODULE

CROSS-REFERENCE TO RELATED APPLICATION

This application claims under 35 U.S.C. §119(a) the benefit of Korean Patent Application No. 10-2012-0125303 filed Nov. 7, 2012, the entire contents of which are incorporated herein by reference.

BACKGROUND (a) Technical Field

The present disclosure relates to a battery module capable of maintaining contact with other battery packs connected in series except for the failed battery packs when some battery packs are failed.

(b) Description of the Related Art

Generally, a battery module of a large capacity mounted to a vehicle, for example, has been used in which a plurality of battery packs are coupled in series. However, each respective battery pack has a slight difference in its durability life due to manufacturing allowances, and further the battery packs are deteriorated or worn out separately in accordance with driving conditions.

In conventional lithium ion secondary batteries or a battery pack thereof, a physical power cut off principle using volume inflation by swelling is applied in order to ensure safety in case of a short circuit and over-charging.

As a representative example of a battery module, in Korean Publication No. 10-0914839, it is disclosed that a middle-large battery pack includes: a battery module of a high output and a large capacity in which a plurality of battery cells or unit modules are connected in series in a lamination state where they are in close contact or adjacent each other, the battery module is fixed to maintain the lamination state of the battery cells or the unit modules even when the battery module varies in their volumes while charging/discharging the battery, and further a part of a coupling portion of the electrode terminals is formed with a fragile structure so that the coupling portion of electrode terminal is ruptured to cut off power when inflation stress caused from a swelling of a battery cell is concentrated on the coupling portion of electrode terminals of the battery cells or the unit modules and the swelling value becomes a predetermined value or more; a battery management system (BMS) for detecting an operation state and controlling it; and a power cut off portion that is disposed between the battery module and an external input-output circuit and connects them in accordance with an operation order from the BMS wherein the plurality of battery modules are fixed by a frame member, outermost battery modules are surrounded by a sealing member fixed to the frame member, and a cutting portion or a notch portion shaped for inducing partial deformation of a swelling battery module is formed on a portion of the sealing member adjacent to the coupling portion of the electrode terminal such that the battery modules are shut off from the power cut off portion independently from the BMS in an abnormal operation condition.

However, according to the related art as described above, since the physical power cut off is induced, a battery system operation stops, and thus it is possible that another risk such as a collision may be caused as the result of an unexpected vehicle stop during driving.

When an auxiliary unit for ensuring additional safety for a vehicle is designed, it is preferred that a battery system can be operated constantly by bypassing an abnormal battery cell and using a normal battery cell, with a pressure switch for sensing gas generation due to swelling conditions of the respective battery cells being mounted to the battery system. Through such an improved configuration, even when the battery system has its power cut off while a vehicle is driven, a secondary collision that may be caused from a vehicle stop before a driver takes an action in advance can be prevented.

The description provided above as a related art of the present invention is just for helping understanding the background of the present invention and should not be construed as being included in the related art known by those skilled in the art.

SUMMARY

The present invention has been made in an effort to solve the above-described problems associated with the related art and it is an object of the present invention to provide a battery module capable of maintaining contact with other battery packs connected in series except for a failed battery pack when one or more battery packs fail.

In particular, the present invention provides a battery module including: a plurality of battery packs, each battery pack being provided with an anode terminal and a cathode terminal; a plurality of coupling units each having ends coupled to the anode terminal and the cathode terminal of an adjacent battery pack, respectively, to couple the plurality of battery packs in series; an operation unit that is provided on one end of the coupling unit and ascends in accordance with an internal pressure increasing in the battery pack to open a coupling between the one end of the coupling unit and the terminals of the battery pack by raising the one end of the coupling unit; and a bypass unit, one end of which is disposed over the one end of the coupling unit and the other end of which is coupled to the other end of an adjacent coupling unit to maintain the other battery packs connected in series except for the battery packs the internal pressures of which are increased, when the one end of the coupling unit ascends by the operation unit.

An anode terminal and a cathode terminal of each of the plurality of battery packs are disposed adjacently in a same direction.

The one end of the coupling unit ascends or descends as a free end and the other end of the coupling unit is coupled to the anode terminal or the cathode terminal of the battery pack.

The operation unit forms a shield space together with an outer skin of the battery pack and includes a shielding film that is pushed outward in accordance with the internal pressure increasing in the battery pack and a pressing unit that is fixed to the shielding film and raises the one end of the coupling unit.

The operation unit is provided to the cathode terminal of the battery pack and the one end of the coupling unit is coupled to the cathode terminal of the battery pack.

The bypass unit has one end disposed over the one end of the coupling unit and the other end coupled to the anode terminal of the battery pack.

A connection device is provided on the anode terminal of the battery pack to couple the anode terminal, the other end of the coupling unit and the other end of the bypass unit together.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
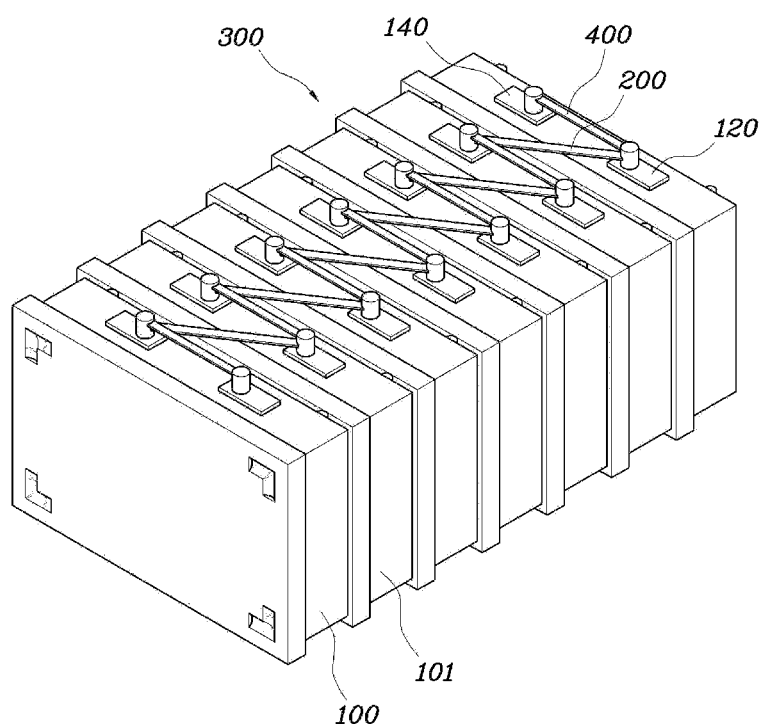
FIG. 1 is a perspective view illustrating a battery module according to an exemplary embodiment of the present invention.

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION

Hereinafter, preferred embodiments of the present invention will be described referring to the accompanying drawings.

Figure 2:
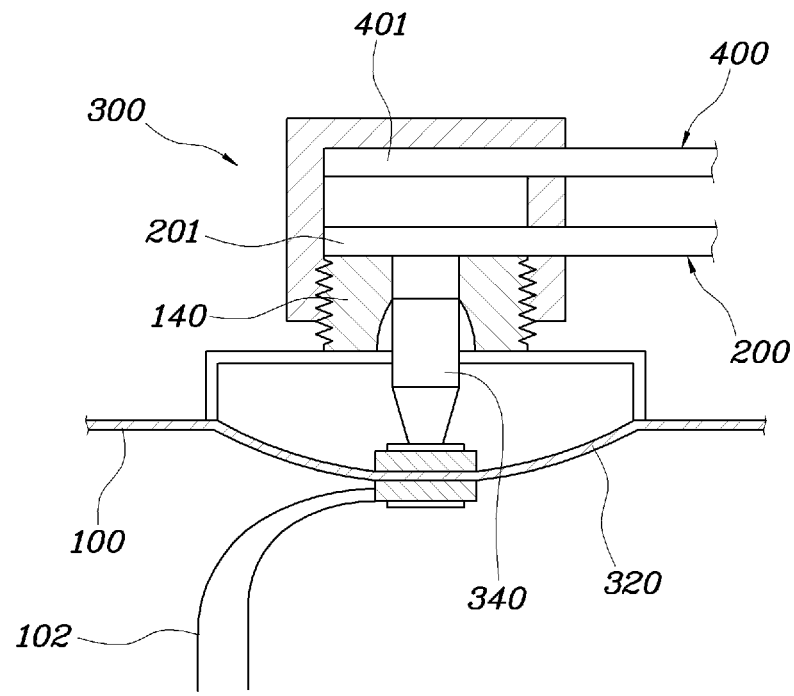
FIGS. 2 and 3 are views illustrating configurations before and after the battery module shown in FIG. 1 is operated, respectively.
Figure 3:
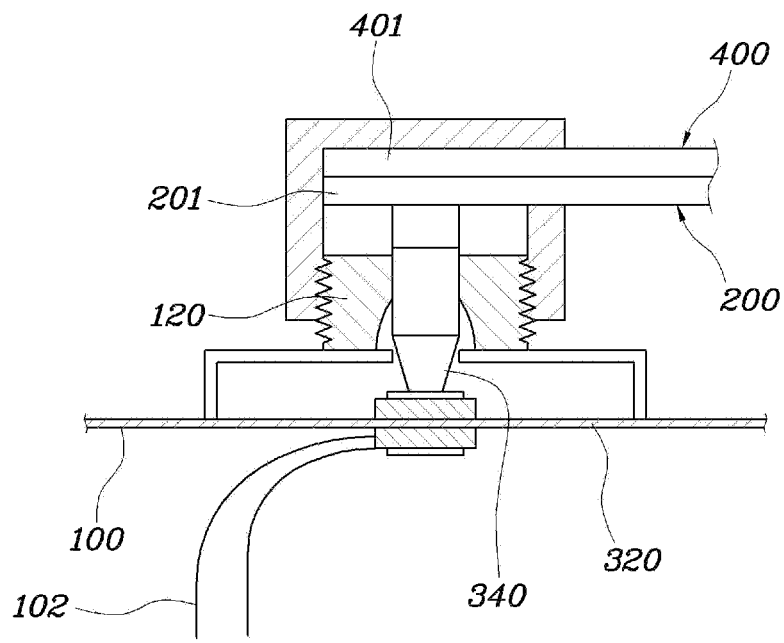

FIG. 1 is a perspective view illustrating a battery module according to an exemplary embodiment of the present invention, and FIGS. 2 and 3 are views illustrating configurations before and after the battery module shown in FIG. 1 is operated, respectively.

A battery module according to the present invention may include: a plurality of battery packs 100 each of which is provided with an anode terminal 120 and a cathode terminal 140; a plurality of coupling units 200 each having ends coupled to the anode terminal 120 and the cathode terminal 140 of the battery pack 100, respectively, to couple the plurality of battery packs 100 in series; an operation unit 300 that is provided on one end 201 of the coupling unit 200 and which is configured to ascend due to internal pressure that increases in the battery pack 100 upon opening a connection between one end 201 of the coupling unit 200 and the terminals of the battery packs 100 by raising the one end 201 of the coupling unit 200; and a bypass unit 400, one end 401 of which is disposed over the one end 201 of the coupling unit 200 and the other end 402 thereof is coupled to the other end 202 of an adjacent coupling unit 200 to maintain the other battery packs 101 except for the battery packs 100 the internal pressures of which are increased, to be coupled in series when the one end 201 of the coupling unit 200 ascends by the operation unit 400.

Further, the anode terminal 120 and the cathode terminal 140 are provided with respect to each battery pack of a battery module, respectively, according to the present invention and one battery module may include a plurality of the battery packs.

In the battery packs 100, the anode terminal 120 and the cathode terminal 140 may be arranged adjacently in one direction to easily form a circuit for coupling the battery packs in series.

In particular, the ends of the coupling unit 200 are coupled to the anode terminal 120 and the cathode terminal 140 of an adjacent battery pack 100, respectively, to couple a plurality of battery packs 100 in series.

That is, one end 201 of the coupling unit 200 may ascend or descend as a free end, and the other end 202 of the coupling unit 200 may be coupled to the anode terminal 120 or the cathode terminal 140 of the battery pack 100. Here, the anode terminal 120 and the cathode terminal 140 may be provided to the battery pack 100 and thus the coupling unit 200 may couple the anode terminal 120 of the battery pack 100 on one side to the cathode terminal 140 of the adjacent battery pack 100 on the other side to couple a plurality of battery packs 100 in series.

However, at any time the one end 201 of the coupling unit 200 can ascend or descend as a free end, and thus it may form an open circuit with the terminal of the battery pack. In accordance with a design of the battery pack, the one end 201 of the coupling unit 200 may be coupled to an anode terminal or a cathode terminal of a battery pack. On the contrary, the other end 202 of the coupling unit 200 may be coupled to the terminal of an adjacent battery pack. In the embodiment shown in the drawings, the coupling unit 200 couples the anode terminal 120 of the battery pack 100 on one side and the cathode terminal 140 of the adjacent battery pack 101 on the other side such that one end 201 of the coupling unit 200 coupled to the cathode terminal 140 is a free end and the other end 202 of the coupling unit 200 coupled to the anode terminal 120 is a fixed end.

The operation unit 300 may be provided at the one end 201 of the coupling unit 200 such that it may ascend due to internal pressure increasing in the battery pack 100 to open a connection of the one end 201 of the coupling unit 200 and the terminals of the battery packs 100 by raising the one end 201 of the coupling unit 200. That is, when the internal pressure of the battery pack 100 is increased, the operation unit 300 ascends for the one end 201 of the coupling unit 200 to form an open circuit by raising the one end 201 of the coupling unit 200, thereby opening the entire connection in series of the battery packs at a corresponding point.

However, one end 401 of the bypass unit 400 is disposed over the one end 201 of the coupling unit 200 and the other end 402 thereof is coupled to the other end 202 of the adjacent another coupling unit 200, and thus when the one end 201 of the coupling unit 200 ascends by the operation unit 300, other battery packs 101 except for the battery packs 100 the inner pressures of which are increased, which are coupled to the one end 201 of the coupling unit 200, can be maintained in a coupled state in series.

In particular, the operation unit 300 may include a shielding film 320 that forms a shield space together with an outer skin of the battery pack 100 and is pushed outward due to internal pressure increasing in the battery pack 100 and a pressing unit 340 that is fixed to the shielding film 320 and raises the one end 201 of the coupling unit 200 wherein the shielding film 320 also ascends by an internal mechanism of the battery pack 100 due to swelling when the internal pressure of the battery pack 100 is increased. Furthermore, the pressing unit 340 provided to the shielding film 320 ascends to open a connection of the one end 201 of the coupling unit 200 and the cathode terminal 140 of the battery pack 100 by raising the one end 201 of the coupling unit 200 due to the internal pressure of the battery pack 100.

Further, the operation unit 300 is provided at the cathode terminal 140 of the battery pack 100, and the one end 201 of the coupling unit 200 is coupled to the cathode terminal 140 of the battery pack 100.

Further, one end 401 of the bypass unit 400 is disposed over the cathode terminal 140 of the battery pack 100, and the other end thereof is coupled to the anode terminal 120 of the battery pack 100, and a connection device 500 may be provided at the anode terminal of the battery pack 100 to connect the anode terminal 120, the other end 202 of the coupling unit 200, and the other end 402 of the bypass unit 400.

As a result, any problematic battery pack(s) can be excluded from their connection in series, and other battery packs may bypass the problematic battery pack(s) to form a circuit in series.

In particular, FIGS. 2 and 3 are views illustrating configurations before and after the battery module shown in FIG. 1 is operated. Referring to FIG. 2, when the internal pressure of the battery pack is in a normal state, it is shown that the one end 201 of the coupling unit 200 is coupled to the cathode terminal 140 of the battery pack 100. However, when the internal pressure of the battery pack 100 is increased, as shown in FIG. 3, the shielding film 320 ascends due to the internal pressure increasing and thus the pressing unit 340 ascends to raise the one end 201 of the coupling unit 200 to open a circuit, and at the same time the one end 201 of the coupling unit 200 is coupled to one end 401 of the bypass unit 400 to form a bypass circuit.

Figure 4:
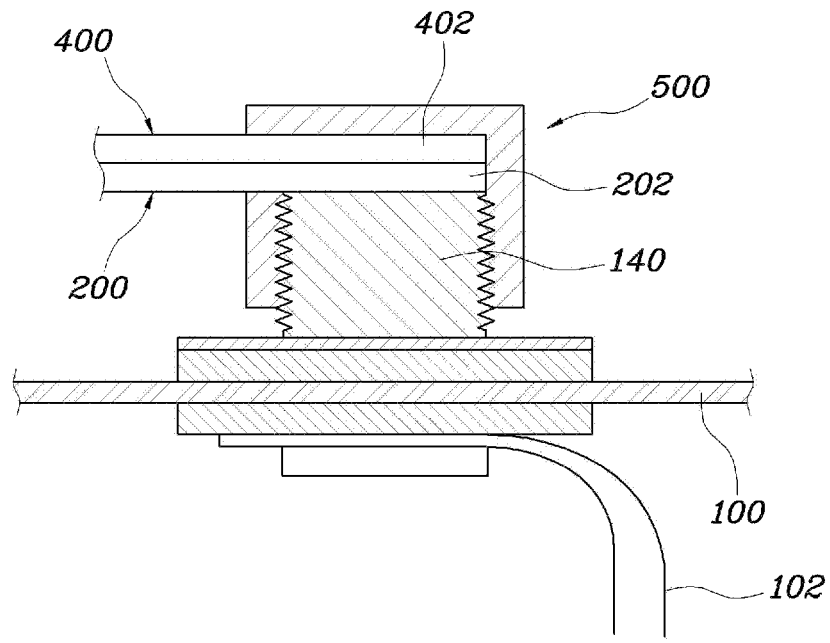
FIG. 4 is a perspective view illustrating another configuration of the battery module shown in FIG. 1.

Meanwhile, as shown in FIG. 4, the anode terminal 120, the other end 202 of the coupling unit 200, and the other end 402 of the bypass unit 400 are always coupled to the connection device.

Figure 5:
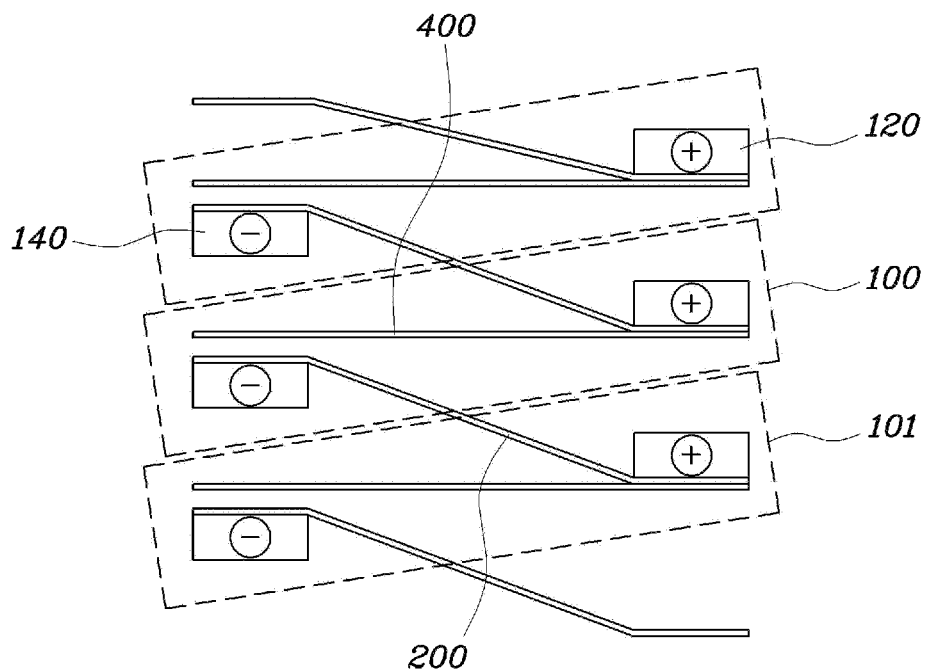
FIGS. 5 and 6 are views illustrating circuits of the battery module shown in FIG. 1 when power is cut off, respectively.
Figure 6:
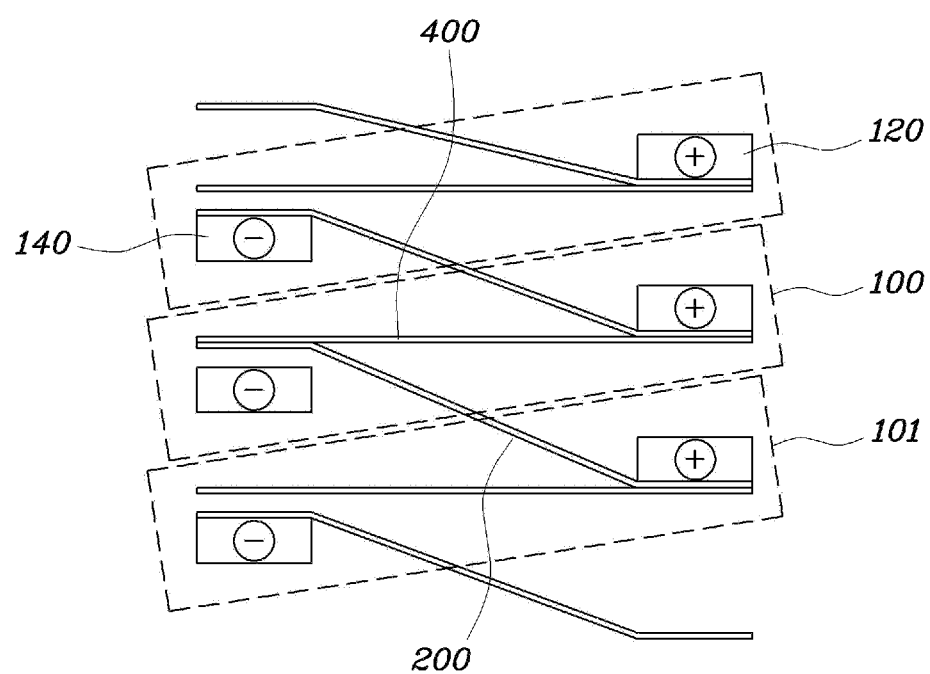

FIGS. 5 and 6 are views illustrating circuits in accordance with a power cutting off of a battery pack module shown in FIG. 1 such that the respective battery packs form a series of circuits connected in series through the coupling units, as shown in FIG. 5.

However, when the internal pressures of some battery packs increase, as shown in FIG. 6, the one end 201 of the corresponding battery pack 100 is raised from the cathode terminal 140 to open the circuit and at the same time the one end is coupled to the one end 401 of the bypass unit 400. Through this configuration, other terminals are coupled normally to keep a coupling of them in series except for the cathode terminal 140 of the corresponding battery pack 100. Accordingly, other battery packs can be coupled in series and maintained in series connection except for the abnormal battery packs the internal pressures of which are increased.

The battery module may be provided with a pressure switch for responding to internal pressure of a battery pack, a vacuum booster for driving the pressure switch, and an electrode circuit for bypassing the abnormal battery pack in order to improve a vehicle safety in a high voltage battery system in which battery packs are connected in series. The vacuum booster can be provided for utilizing pressure (vacuum) variation inside a can as a driving force wherein it boosts minute internal pressure variation in the battery pack and transfers it to the pressure switch even when the internal pressure is increased minutely due to an abnormal cell reaction. The vacuum booster may respond directly to a physical pressure variation without electrical signal. Further, the bypass electrode circuit is a type of busbar that shorts an abnormal battery cell terminal when the pressure switch is driven and at the same time forms a new circuit in series.

That is, the battery module according to the present invention can ensure reliability of a battery system by sensing minute pressure variations in an abnormal battery pack and cutting off power physically per battery when the internal pressure is increased to a predetermined level or more.

Additionally, a circuit can be kept in use constantly by cutting off physical power with respect to an abnormal battery pack and bypassing the circuit to a normal battery pack, and thus vehicle safety can be ensured.

Meanwhile, pressure (vacuum) variation within the shorted battery is converted into a driving force by using the booster (booster pack), and bypass electrode circuits are applied to the respective shorted batteries to improve safety of the battery system.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A battery module comprising;
   a plurality of battery packs, each battery back being provided with an anode terminal and a cathode terminal;
   a plurality of coupling units each having ends coupled to the anode terminal and the cathode terminal of an adjacent battery pack, respectively, to couple the plurality of battery packs in series;
   an operation unit that is provided on one end of the coupling unit and ascends in accordance with an internal pressure increasing in the battery pack to open a coupling between the one end of the coupling unit and the terminals of the battery pack by raising the one end of the coupling unit; and
   a bypass unit having one end disposed over the one end of the coupling unit and the other end of which is coupled to the other end of an adjacent coupling unit to maintain the other battery packs coupled in series, except for the battery packs the internal pressures of which have increased, when the one end of the coupling unit ascends by the operation unit,
   wherein the one end of the coupling unit ascends or descends as a free end and the other end of the coupling unit is coupled to the anode terminal or the cathode terminal of the battery pack.

2. The battery module according to claim 1, wherein the anode terminal and the cathode terminal of each of the plurality of battery packs are disposed adjacently in a same direction.

3. The battery module according to claim 1, wherein the operation unit forms a shield space together with an outer skin of the battery pack and further comprises:
   a shielding film that is pushed outward in accordance with the internal pressure increasing of the battery pack; and
   a pressing unit that is fixed to the shielding film and raises the one end of the coupling unit.

4. The battery module according to claim 1, wherein the operation unit is provided at the cathode terminal of the battery pack, and the one end of the coupling unit is coupled to the cathode terminal of the battery pack.

5. The battery module according to claim 4, wherein the bypass unit has one end disposed over the one end of the coupling unit and the other end coupled to the anode terminal of the battery pack.

6. The battery module according to claim 4, wherein a connection device is provided on the anode terminal of the battery pack to couple the anode terminal, the other end of the coupling unit, and the other end of the bypass unit together.

7. A battery module comprising;
- a plurality of battery packs, each battery back being provided with an anode terminal and a cathode terminal;
- a plurality of coupling units each having ends coupled to the anode terminal and the cathode terminal of an adjacent battery pack, respectively, to couple the plurality of battery packs in series;
- an operation unit that is provided on one end of the coupling unit and ascends in accordance with an internal pressure increasing in the battery pack to open a coupling between the one end of the coupling unit and the terminals of the battery pack by raising the one end of the coupling unit; and
- a bypass unit having one end disposed over the one end of the coupling unit and the other end of which is coupled to the other end of an adjacent coupling unit to maintain the other battery packs coupled in series, except for the battery packs the internal pressures of which have increased, when the one end of the coupling unit ascends by the operation unit,
- wherein the operation unit is provided at the cathode terminal of the battery pack, and the one end of the coupling unit is coupled to the cathode terminal of the battery pack, and
- the bypass unit has one end disposed over the one end of the coupling unit and the other end coupled to the anode terminal of the battery pack.

8. The battery module according to claim 7, wherein a connection device is provided on the anode terminal of the battery pack to couple the anode terminal, the other end of the coupling unit, and the other end of the bypass unit together.

9. A battery module comprising;
- a plurality of battery packs, each battery back being provided with an anode terminal and a cathode terminal;
- a plurality of coupling units each having ends coupled to the anode terminal and the cathode terminal of an adjacent battery pack, respectively, to couple the plurality of battery packs in series;
- an operation unit that is provided on one end of the coupling unit and ascends in accordance with an internal pressure increasing in the battery pack to open a coupling between the one end of the coupling unit and the terminals of the battery pack by raising the one end of the coupling unit; and
- a bypass unit having one end disposed over the one end of the coupling unit and the other end of which is coupled to the other end of an adjacent coupling unit to maintain the other battery packs coupled in series, except for the battery packs the internal pressures of which have increased, when the one end of the coupling unit ascends by the operation unit,
- wherein the operation unit is provided at the cathode terminal of the battery pack, and the one end of the coupling unit is coupled to the cathode terminal of the battery pack, and
- a connection device is provided on the anode terminal of the battery pack to couple the anode terminal, the other end of the coupling unit, and the other end of the bypass unit together.

\* \* \* \* \*